(12) United States Patent
Williams

(10) Patent No.: US 11,472,477 B2
(45) Date of Patent: Oct. 18, 2022

(54) MOTOR AND A STEER BY WIRE HANDWHEEL ACTUATOR

(71) Applicant: TRW Limited, Solihull (GB)

(72) Inventor: Connel Brett Williams, Leamington Spa (GB)

(73) Assignee: ZF Automotive UK Limited

( * ) Notice: Subject to any disclaimer, the term of this patent is extended or adjusted under 35 U.S.C. 154(b) by 622 days.

(21) Appl. No.: 16/523,030

(22) Filed: Jul. 26, 2019

(65) Prior Publication Data

US 2020/0031390 A1 Jan. 30, 2020

(30) Foreign Application Priority Data

Jul. 26, 2018 (GB) ...................................... 1812216

(51) Int. Cl.
| | | |
|---|---|---|
| *B62D 6/00* | (2006.01) | |
| *B62D 5/00* | (2006.01) | |
| *H02K 16/04* | (2006.01) | |
| *H02K 11/33* | (2016.01) | |

(52) U.S. Cl.
CPC ............ *B62D 6/008* (2013.01); *B62D 5/005* (2013.01); *H02K 11/33* (2016.01); *H02K 16/04* (2013.01)

(58) Field of Classification Search
CPC ......... B62D 6/008; B62D 5/005; H02K 16/04
See application file for complete search history.

(56) References Cited

U.S. PATENT DOCUMENTS

| | | | |
|---|---|---|---|
| 5,821,710 A | 10/1998 | Masuzawa | |
| 2002/0117933 A1 | 8/2002 | Joong et al. | |
| 2003/0201686 A1* | 10/2003 | Narita ................... | H02K 16/04 310/211 |

(Continued)

FOREIGN PATENT DOCUMENTS

| | | | | |
|---|---|---|---|---|
| CN | 105871140 A | * | 8/2016 | |
| CN | 106026578 A | * | 10/2016 | |
| CN | 106602823 A | * | 4/2017 | ............. H02K 1/146 |

OTHER PUBLICATIONS

GB Patents Act 1977: Search Report under Section 17(5), Application No. GB1812216.8, dated Dec. 12, 2018.

*Primary Examiner* — Jacob D Knutson
(74) *Attorney, Agent, or Firm* — Robert James Harwood

(57) ABSTRACT

An electromagnetic motor comprising an inner stator comprising a plurality of stator teeth, each surrounded by one or more turns of electrical wire, a controller which generates a set of currents that are applied to phase windings of the inner stator to generate a pattern of magnetic poles spaced around the inner stator, the spacing between the magnetic poles being larger than the spacing between adjacent teeth of the inner stator, an outer stator that is concentric with the inner stator and comprises an alternating set of magnet poles, the spacing between adjacent magnet poles being smaller than the spacing of the magnetic poles of a first array created by the controller, and an intermediate rotor part that is located between the inner stator and the outer stator and comprises an array of pole pieces, in which the pole pieces of the intermediate rotor part shape a magnetic flux acting between the inner and outer stators, and whereby in use the controller is arranged to control a torque applied to the rotor part by moving the pattern of magnetic poles of the inner stator around an axis of a torque generator.

12 Claims, 4 Drawing Sheets

(56) References Cited

U.S. PATENT DOCUMENTS

| | | | |
|---|---|---|---|
| 2004/0264075 A1 | 12/2004 | Kolomeitsev | |
| 2008/0224559 A1 | 9/2008 | Niguchi | |
| 2013/0264895 A1* | 10/2013 | Kondou | H02K 1/06 310/46 |
| 2014/0159533 A1* | 6/2014 | Kondou | H02K 1/276 310/156.53 |

* cited by examiner

MOTOR AND A STEER BY WIRE HANDWHEEL ACTUATOR

CROSS-REFERENCE TO RELATED APPLICATIONS

This application is a national stage of Great Britain Patent Application No. 1812216.8, filed 26 Jul. 2018, the disclosures of which are incorporated herein by reference in entirety.

BACKGROUND TO THE INVENTION

This invention in one aspect relates to electric motors, in particular hut not exclusively suitable for use as a feedback torque generator. In another aspect the invention relates to a steer by wire handwheel actuator incorporating a feedback torque generator for use in an automotive vehicle.

Feedback torque generators are known for use in a range of applications. One such application is a steer by wire steering system. In a conventional system, such as that shown in FIG. 1, a handwheel 1 is connected to one or more steerable road wheels (not shown) of the vehicle through a mechanical connection. In the example this connection comprises a steering column shaft 2 that is connected at one end to a boss 3 of the steering wheel and at the other end to a rack and pinion gearbox 4 that drives a steering rack 5. This mechanical connection gives the driver some important feedback as to what is happening at the interface between the tyres and the road surface, helping them to control the vehicle.

In a steer by wire steering system, as shown in FIG. 2, there is no direct mechanical linkage between the road wheels (not shown) and a handwheel 11. Some form of artificial steering feel must therefore be applied to the handwheel to give the driver some indication of what is happening at the tyre/road interface and to simulate the forces that are produced as the vehicle passes over bumps or holes in the road.

In a steer by wire steering system, it is therefore known to provide a feedback torque generator 12 that provides a torque to the steering wheel. Movement of the roadwheels is effected by an actuator such as a motor 13 that drives a steering rack 14 through a rack and pinion gearbox 15. The magnitude and direction of the torque that is applied to the handwheel is controlled by an electronic control unit (ECU 16) which receives signals from a range of sensors (not shown) fitted to the vehicle measuring parameters such as the vehicle speed, relative rotational speed of the different road wheels of the vehicle; the roll angle of the vehicle and position of the handwheel and so on. The ECU 16 also controls the function of the motor that causes the road wheels to be steered.

The feedback torque may be applied to the steering wheel by a variety of means; such as an electric motor or an arrangement of springs; dampers, and brakes. This can be used to allow the driver to feel the wheels striking a stone or hole, or to lighten the feel at the steering wheel when the tyres are running on a low friction road surface, e.g. a wet or icy road surface.

The term steering wheel in this description should be construed broadly to encompass both a conventional wheel having a generally circular continuous or discontinuous rim that the driver can grip which is supported by a hub, as well as a pair of opposed hand grips that are supported by the hub that can rotate around a circular path, an arrangement similar to the yokes commonly used in aircraft. The handgrips and hub may form a W, M, or U shaped configuration for example. In each case the feedback torque is typically applied to the portion that the driver holds through the hub, by connecting the hub to a generator of the feedback torque.

In a steer by wire application, the feedback torque generator must provide relatively high levels of torque at low speeds, and to achieve this in a cost effective manner using an electric motor it has been proposed to connect the handwheel to the electric motor through a step down gearbox, where the speed of rotation of the motor is greater than the speed of rotation of the steering wheel by an amount set by the gear ratio of the gearbox. The use of a gearbox allows a relatively low cost motor to provide the required torque at low speeds. Such arrangements are, however, complex and inherently bulky due to the need to provide a separate motor and gearbox.

SUMMARY OF THE INVENTION

A first aspect of the invention is to provide a motor that is suitable in some applications for use as a feedback torque generator that ameliorates limitations of prior art generators that connect an electric motor to a gearbox.

In accordance with a first aspect the invention provides an electromagnetic motor comprising: an inner stator comprising a plurality of stator teeth, each surrounded by one or more turns of electrical wire, a controller which generates a set of currents that are applied to the phase windings of the inner stator to generate a pattern of magnetic poles spaced around the inner stator, the spacing between the poles being larger than the spacing between adjacent teeth of the inner stator, an outer stator that is concentric with the inner stator and comprises an alternating set of magnet poles, the spacing between adjacent poles being smaller than the spacing of the magnetic poles of the first array created by the controller, and an intermediate rotor part that is located between the inner stator and the outer stator and comprises an array of pole pieces, in which the pole pieces of the rotor shape the magnetic flux acting between the two stators, and whereby in use the controller is arranged to control the torque applied to the rotor by moving the pattern of magnetic poles of the inner stator around the axis of the torque generator.

By this invention, the controller produces a moving flux pattern at the inner stator that interacts with a fixed pattern of flux from the outer stator that has been shaped by the pole pieces of the rotor, causing a torque to be applied to the rotor. The rotor will rotate in a direction that follows the rotation of the fixed pole pattern of the inner stator but at a reduced speed, so that there is some inherent gearing in the actuator which allows it to provide relatively high torque at low speeds of rotation of the rotor and a relatively high force density.

The inner stator may be supplied with currents that generate a movable pattern comprising two magnetic poles and the outer stator may have more than two magnetic poles, and the pole pieces may shape the flux from the poles of the second magnetic poles to generate two magnetic poles in the region where the flux from the first fixed portion meets the flux from the second fixed portion.

The movable pattern may be a constant pattern, simply being moved around the axis of the inner stator. Where there are two poles, for example, they may be evenly spaced at all times but the location of the two poles will move under the control of the controller.

In one workable arrangement, the outer stator may consist of 44 magnetic poles generated by 22 pairs of magnets, and the rotor may consist of 26 pole pieces, and the controller may generate four pairs of magnetic pole pairs on the inner stator, each pair comprising one North and one South Pole. Other numbers of poles and pole pieces may be provided within the scope of this invention.

Other numbers of magnetic poles and pole pieces may be used, with the aim being for the pole pieces to couple a strong, ideally first, harmonic of the magnetic flux from the second fixed portion to a matching pattern of pole generated by the windings and teeth of the first fixed portion.

The inner stator may define four pairs of magnetic poles, the second fixed portion may define more than four pairs of magnetic poles, and the pole pieces may shape the flux from the poles of the second magnetic poles to generate four pairs of magnetic poles in the region where the flux from the outer stator portion meets the flux from the inner stator.

Other numbers of magnetic poles and pole pieces may be used, with the aim being for the pole pieces to couple a strong, ideally first, harmonic of the magnetic flux from the second fixed portion to a matching pattern of pole generated by the windings and teeth of the first fixed portion.

The pole pieces of the rotor may comprise ferrous metallic pole pieces, most preferably steel pole pieces. They may be supported by a non-ferrous carrier. For instance, they may be fixed onto or buried within a carrier. The pole pieces do not need to be magnets, unlike prior art linear actuators, because their function is solely to shape the magnetic flux from the second fixed portion in the airgap between the two stators.

The outer stator may comprise an array of permanent magnets, each magnet defining one pole of the second fixed portion. The magnets may be arranged in an alternating North-South pattern to create alternating North and South magnetic poles in the air gap between the second fixed portion and the output member.

In an alternative, the outer stator may comprise an array of electromagnets. Each electro magnet may comprise a tooth around which is wound a length of conductive wire forming a coil. The coils may be supplied with a current from a controller which generates a fixed non-moving pattern of flux defining the poles of the second fixed portion.

A single controller may drive the windings of both stators although of course different patterns of current will be applied to the coils of each stator as one requires a moving DC field and the other a fixed DC field.

According to a second aspect the invention provides a handwheel actuator assembly for a steer by wire steering system of a vehicle, the assembly comprising: a steering wheel having at least one hand grip portion rotatable around an axis of rotation of the steering wheel which can be gripped by a driver, the steering wheel having a hub that supports the hand grip portion; and a feedback torque generator comprising an electromagnetic motor according to the first aspect of the invention wherein the rotor of the motor is directly or indirectly fixed to and rotates with the hub of the steering wheel and the stator is secured to a fixed part of the vehicle body such that it cannot rotate relative to the vehicle body.

The reader will appreciate that the torque feedback actuator of the invention shares a common axis of rotation with the steering wheel, so that the two move together around that axis at the same rotational speed.

The hub may be secured to the rotor of the feedback torque generator through a stub shaft, the shaft having an axis of rotation that lies on the axis of rotation of the hub and the rotor. The stub shaft may pass through or extend only partially into a region within the stator.

The steering wheel hub may include a boss which fits onto an end of the stub shaft. Splines on the stub shaft may engage complimentary splines on the boss to prevent relative rotation of the stub shaft and steering wheel.

The motor may be offset axially from the steering wheel.

The stub shaft may be supported by at least one, and preferably two, bearing assemblies. The bearing assemblies may lie on the side of the motor nearest the driver, or may lie on the side of the motor furthest from the motor. One bearing assembly may be located on each side of the motor.

Where the two or more bearing assemblies are located on the side of the motor nearest the driver, a shroud that supports one or more column switches may surround the stub shaft.

The stub shaft may be fixed to a bracket which is in turn fixed to the rotor. The steering wheel in such an arrangement is indirectly connected to the rotor through the stub shaft and then through the housing. The stub shaft may be fixed to the bracket using an interference fit, or by welding of the housing to the stub shaft, or fixed using adhesive. Splines on the stub shaft may connect to splines of the bracket. The bracket may, alternatively, be integral to the stub shaft.

Other advantages of this invention will become apparent to those skilled in the art from the following detailed description of the preferred embodiments, when read in light of the accompanying drawings.

DETAILED DESCRIPTION OF THE INVENTION

Figure 1:
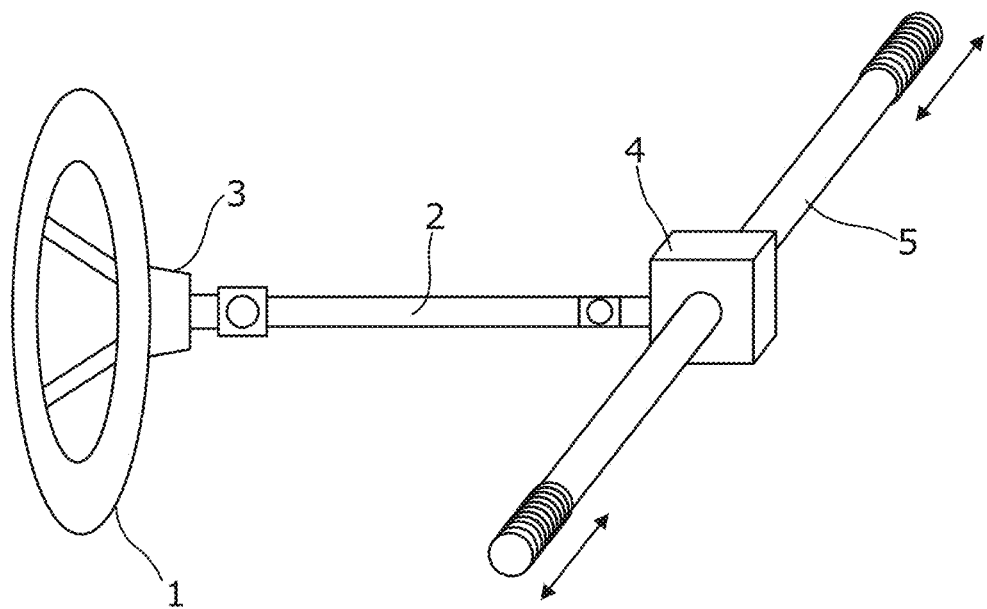
FIG. 1 is an overview of the main components of a typical steering system of a vehicle.
Figure 2:
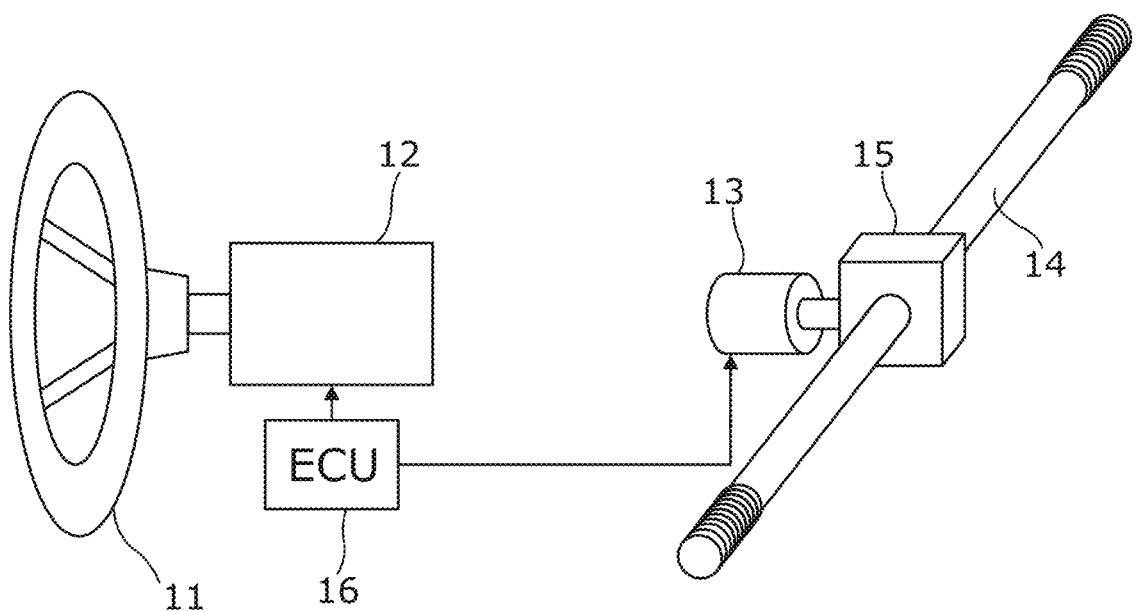
FIG. 2 is an overview of the main components of a typical prior art steer by wire steering system.
Figure 3:
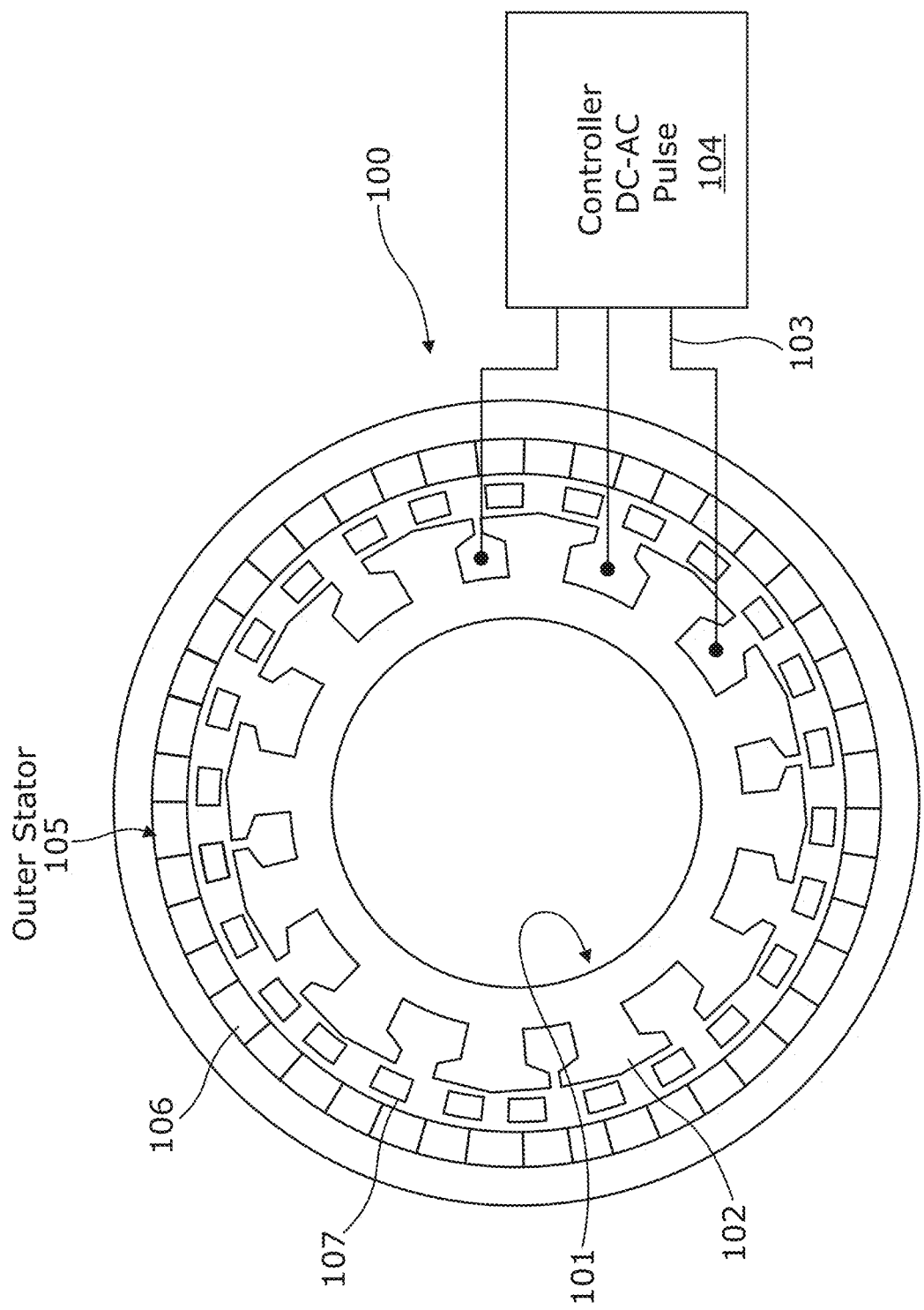
FIG. 3 is a cross section view of a motor in accordance with the present invention looking along the axis of rotation of the rotor.

As shown in FIG. 3, a motor 100 comprises an annular inner stator 101 comprising 12 stator teeth 102, each surrounded by one or more turns of electrical wire (not shown). The wires are connected together in three phases 103, enabling current to be passed through each phase independently.

A controller 104 is provided which in use generates a set of currents that are applied to the phase windings of the inner stator to generate a pattern of magnetic poles along the array of teeth, the spacing between the poles being larger than the spacing between adjacent teeth of the first fixed portion. In this example, current waveforms are applied that generate a pattern with four pairs of poles—four North and four South poles, with equal spaces between them. The number of poles is therefore less than the number of stator teeth. Importantly, the pattern of poles can be moved along the first fixed portion by changing the currents applied to the windings.

The windings of the teeth 102 and the current waveforms used together enable the required pole pattern to be generated.

An annular outer stator 105 surrounds the inner stator with an airgap between the two. The two stators share a common axis so that the outer stator is concentric with the inner stator 101. The outer stator 105 comprises an alternating set of magnet poles 106, the spacing between adjacent poles being smaller than the spacing of the magnetic poles of the first array created by the controller. In this example there are 44 magnets spaced equally around the outer stator 105.

Between the two stators is an annular rotor 107. This rotor comprises an array of pole pieces, alternating between North and South poles. The pole pieces are supported by a non-ferrous carrier. In the illustrated example there are 26 pole pieces.

Figure 5:
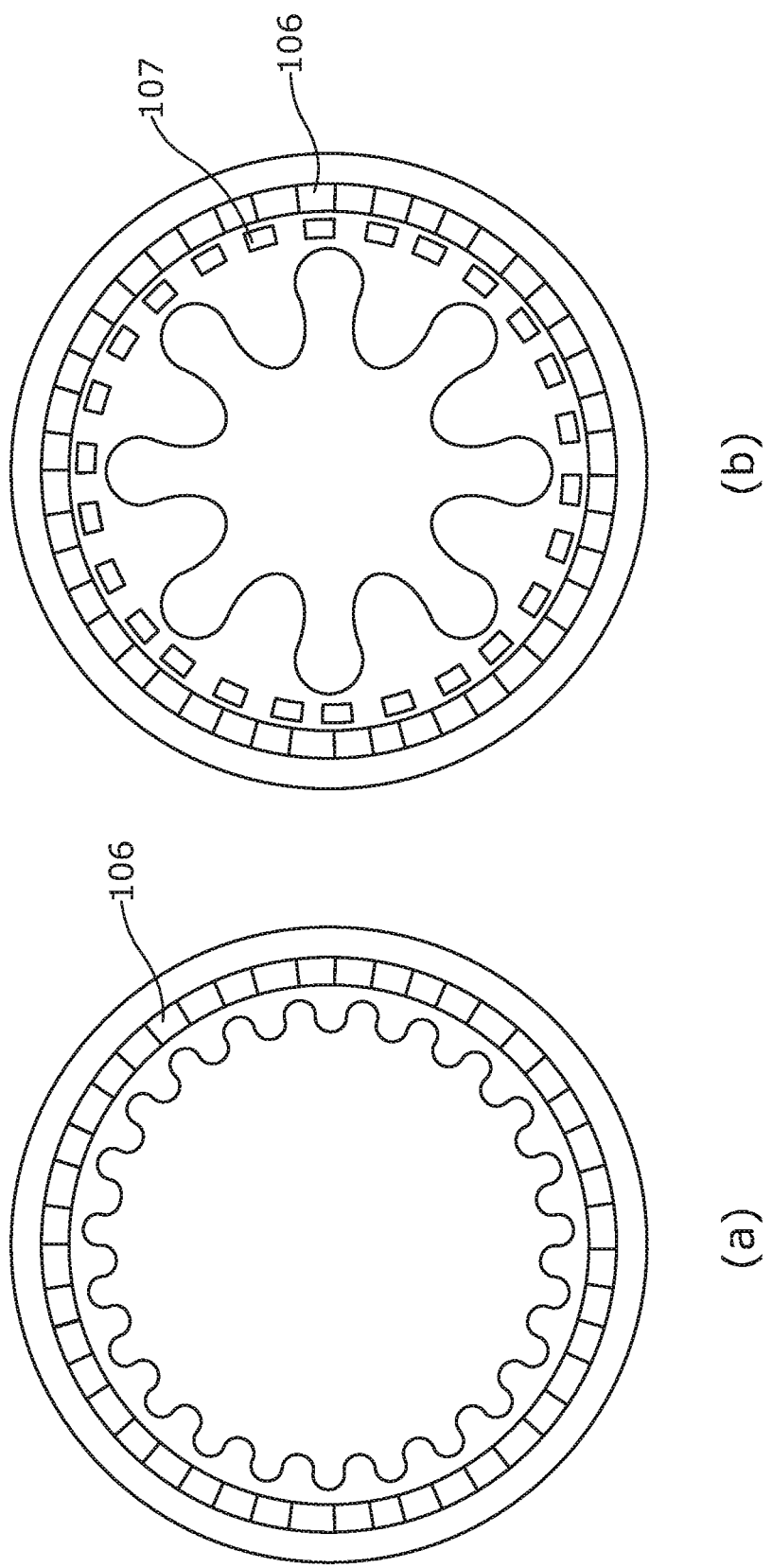
FIG. 5 (a) shows the flux pattern generated by the outer stator magnets alone, and (b) shows the shaped flux pattern that is modified by the rotor poles, this pattern rotating as the rotor rotates around its axis.

The presence of the pole pieces in the airgap between the two stators shapes, or distorts, the magnetic flux pattern from the outer stator 105. This can be seen by comparing FIG. 5(a) for the case where the inner stator and rotor are both removed with FIG. 5(b) where the rotor interacts with the outer stator. The rotor can be seen to have shaped the flux to form a flux pattern similar to that which would be created with only four pairs of North/South poles on the outer stator. Importantly, movement of the rotor by a small distance relative to the outer stator will result in substantially the same shaped flux pattern but shifted in the direction of movement of the rotor. The cause of this shaping is well understand in the context of pseudo-direct drive motors and a detailed discussion is given in international patent application WO2007/125284 in the name of University of Sheffield where the concept is used in the design of a rotary electrical machine.

The reader will appreciate that modified flux pattern from the permanent magnets of the outer stator will interact with the similar flux pattern from the inner stator, and by moving the pole pattern of the inner stator Lorenz forces will act on the rotor causing it to try to move to realign the flux patterns to a position in which there is no torque acting on the rotor. As this causes movement of the rotor, the way in which the flux from the second fixed part changes, and this results in the rotor moving much slower than the pole pattern of the first fixed is moved. The result is a form of magnetic gearing which is beneficial in providing high force density for the motor.

Figure 4:
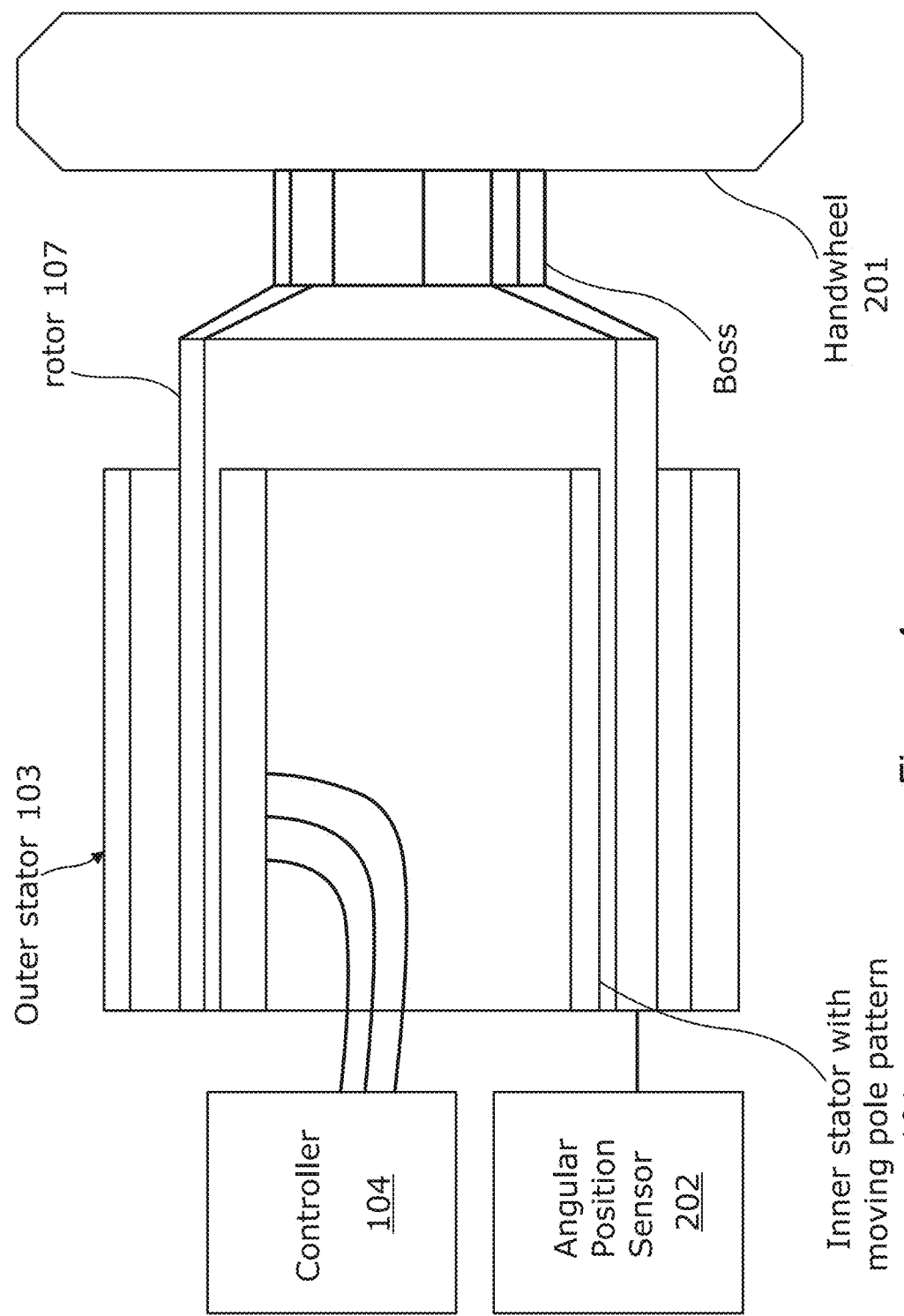
FIG. 4 is a cross sectional view of an embodiment of a handwheel actuator assembly, the section passing vertically through the axis of rotation of the rotor, the actuator assembly falling within the scope of the second aspect of the invention that may be used in a steer by wire system for a vehicle.

The motor 100 may be used in a handwheel assembly 200 of a steer by wire system, and an exemplary embodiment that falls within the scope of a second aspect of the invention is shown in FIG. 4.

The handwheel assembly comprises a steering wheel 201 having a relatively thin generally round rim that defines a hand grip portion that is rotatable around an axis of rotation of the steering wheel. The rim can be gripped by a driver by either or both hands in a conventional manner, and the driver can rotate the steering wheel around a central axis of rotation. Many other forms of handwheel may be provided within the scope of this invention, with the steering wheel not being required to have a round rim.

The steering wheel 201 has a hub that comprises a single dished arm or spoke that has a first end connected to the rim and a second end that is connected to a boss 203. Multiple spokes may be provided, depending on the style of the hand grip and the rigidity of the steering wheel this is required and the invention is not to be limited to one spoke. The boss 203 is located on the axis of rotation of the steering wheel 201 and supports the hand grip portion. A recess in the boss has a set of radially inwardly facing splines (not shown) and is pressed onto the end of the rotor 107 of the motor such as that shown in FIG. 3 which has a set of complimentary radially outwardly projecting splines in a conventional manner for fixing a steering wheel to a steering shaft. The splines ensure that the steering wheel when rotated will create a corresponding rotation of the rotor and vice versa. The feedback torque generator is of the kind shown in FIG. 3.

In use, as the rotor 107 rotates, the stub shaft rotates, which finally causes the steering wheel 201 to rotate. Applying a torque to the rotor 107 can therefore be used to turn the steering wheel or to apply a torque that resists partially the torque applied to the steering wheel by the driver to simulate road feel and give the driver a sensation of the forces acting on the roadwheels and other parts of the steering system.

Also shown is an angular position sensor 202 which determines the angular position of the steering wheel from the angular position of the rotor relative to the stator.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit and scope.

What is claimed is:

1. An electromagnetic motor comprising:
    an inner stator comprising a plurality of stator teeth, each surrounded by one or more turns of electrical wire,
    a controller which generates a set of currents that are applied to phase windings of the inner stator to generate a pattern of magnetic poles spaced around the inner stator, the spacing between the magnetic poles being larger than the spacing between adjacent teeth of the inner stator,
    an outer stator that is concentric with the inner stator and comprises an alternating set of magnet poles, a spacing between adjacent magnet poles being smaller than a spacing of the magnetic poles of a first array created by the controller, and
    an intermediate rotor part that is located between the inner stator and the outer stator and comprises an array of pole pieces, in which the pole pieces of the intermediate rotor part shape a magnetic flux acting between the inner and outer stators, and
    whereby in use the controller is arranged to control a torque applied to the rotor part by moving the pattern of magnetic poles of the inner stator around an axis of a torque generator.

2. The electromagnetic motor according to claim 1 in which the inner stator is supplied with currents that generate a movable pattern comprising two magnetic poles of the pattern of magnet poles, the alternating set of magnet poles of the outer stator includes more than two magnet poles, and the pole pieces in use shape the magnetic flux from the poles of the second magnetic poles to generate two magnetic poles in a region where the magnetic flux from a first fixed portion meets the magnetic flux from a second fixed portion.

3. The electromagnetic motor according to claim 2 in which the movable pattern is a constant pattern.

4. The electromagnetic motor according to claim 2 in which the outer stator comprises an array of permanent magnets, each magnet defining one pole of the second fixed portion.

5. The handwheel actuator assembly according to claim 2 in which the alternating set of magnet poles of the outer stator includes the more than two magnet poles comprises 22

North magnet poles and 22 South magnet poles arranged in an alternating North-South pattern.

6. The electromagnetic motor according to claim 1 in which the pole pieces of the intermediate rotor part comprise ferrous metallic pole pieces.

7. The electromagnetic motor according to claim 1 in which the outer stator comprises an array of electromagnets.

8. A handwheel actuator assembly for a steer by wire steering system of a vehicle, the assembly comprising:
- a steering wheel having at least one hand grip portion rotatable around an axis of rotation of the steering wheel which can be gripped by a driver, the steering wheel having a hub that supports the hand grip portion; and
- a feedback torque generator comprising an electromagnetic motor according to claim 1 wherein the intermediate rotor part of the motor is directly or indirectly fixed to and rotates with the hub of the steering wheel and the outer stator is secured to a fixed part of a vehicle body such that the outer stator cannot rotate relative to the vehicle body.

9. The handwheel actuator assembly according to claim 8 in which the hub is secured to the rotor part of the feedback torque generator through a stub shaft, the stub shaft having an axis of rotation that lies on the axis of rotation of the hub and the intermediate rotor part.

10. The handwheel actuator assembly according to claim 9 in which the hub includes a boss which fits onto an end of the stub shaft.

11. The handwheel actuator assembly according to claim 8 in which the motor is offset axially from the steering wheel.

12. The handwheel actuator assembly according to claim 8 in which the inner stator is secured to the fixed part of the vehicle body such that the inner stator cannot rotate relative to the vehicle body.

* * * * *